US012440758B2

(12) United States Patent
Cui et al.

(10) Patent No.: US 12,440,758 B2
(45) Date of Patent: Oct. 14, 2025

(54) VIRTUAL OBJECT CONTROL METHOD AND APPARATUS, TERMINAL, STORAGE MEDIUM, AND PROGRAM PRODUCT

(71) Applicant: Tencent Technology (Shenzhen) Company Limited, Shenzhen (CN)

(72) Inventors: Weijian Cui, Shenzhen (CN); Meng Qiu, Shenzhen (CN); Boyi Liu, Shenzhen (CN); Cong Tian, Shenzhen (CN); Dancheng Zou, Shenzhen (CN); Yu Deng, Shenzhen (CN); Jingjing He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 327 days.

(21) Appl. No.: 18/204,849

(22) Filed: Jun. 1, 2023

(65) Prior Publication Data

US 2023/0321537 A1 Oct. 12, 2023

Related U.S. Application Data

(63) Continuation of application No. PCT/CN2022/122479, filed on Sep. 29, 2022.

(30) Foreign Application Priority Data

Oct. 20, 2021 (CN) ......................... 202111221286.2
Dec. 30, 2021 (CN) ......................... 202111653411.7

(51) Int. Cl.
*A63F 13/42* (2014.01)
*A63F 13/52* (2014.01)
(Continued)

(52) U.S. Cl.
CPC ............ *A63F 13/533* (2014.09); *A63F 13/42* (2014.09); *A63F 13/52* (2014.09); *A63F 13/56* (2014.09)

(58) Field of Classification Search
CPC ............................. A63F 13/42; A63F 13/2145
See application file for complete search history.

(56) References Cited

U.S. PATENT DOCUMENTS 12,005,360 B2 * 6/2024 Hu .......................... A63F 13/56
2010/0273544 A1 10/2010 Koganezawa et al.
(Continued)

FOREIGN PATENT DOCUMENTS

CN 107551537 A 1/2018
CN 109045689 A 12/2018
(Continued)

OTHER PUBLICATIONS

Tencent Technology, WO, PCT/CN2022/122479, Jan. 6, 2023, 5 pgs.
(Continued)

*Primary Examiner* — Jay Trent Liddle
(74) *Attorney, Agent, or Firm* — Morgan, Lewis & Bockius LLP

(57) ABSTRACT

A virtual object control method is performed by a terminal. The method includes: displaying a virtual environment picture and an attack control; in response to a first trigger operation on the attack control, displaying an action control adjacent the attack control, the action control being configured to trigger the virtual object to perform a non-attack action; and in response to a second trigger operation on the action control, controlling the virtual object to perform a first action according to the action control while performing attacks according to the attack control. The method provided in embodiments of this application may reduce the operation
(Continued)

difficulty of controlling a virtual object to attack and performing other actions simultaneously.

17 Claims, 12 Drawing Sheets

(51) Int. Cl.
*A63F 13/533* (2014.01)
*A63F 13/56* (2014.01)

(56) References Cited

U.S. PATENT DOCUMENTS

| | | | | |
|---|---|---|---|---|
| 2015/0182856 | A1 | 7/2015 | Mays, III et al. | |
| 2018/0043260 | A1* | 2/2018 | Tang | A63F 13/822 |
| 2020/0298104 | A1* | 9/2020 | Wang | A63F 13/422 |
| 2021/0260479 | A1 | 8/2021 | Yang | |
| 2021/0387087 | A1* | 12/2021 | Liu | A63F 13/5378 |
| 2022/0032187 | A1* | 2/2022 | Hu | A63F 13/537 |
| 2022/0080314 | A1* | 3/2022 | Zhang | A63F 13/53 |
| 2022/0266136 | A1* | 8/2022 | Yang | A63F 13/52 |
| 2024/0286032 | A1* | 8/2024 | Li | G06F 3/04883 |
| 2024/0293731 | A1* | 9/2024 | Tong | A63F 13/55 |

FOREIGN PATENT DOCUMENTS

| | | | |
|---|---|---|---|
| CN | 109157832 | A | 1/2019 |
| CN | 109316745 | A | 2/2019 |
| CN | 109364476 | A | 2/2019 |
| CN | 109460179 | A | 3/2019 |
| CN | 109847370 | A | 6/2019 |
| CN | 110270098 | A | 9/2019 |
| CN | 110354489 | A | 10/2019 |
| CN | 110694261 | A | 1/2020 |
| CN | 111621194 | A | 9/2020 |
| CN | 111921198 | A | 11/2020 |
| CN | 112023392 | A | 12/2020 |
| CN | 112121431 | A | 12/2020 |
| CN | 114225372 | A | 3/2022 |
| JP | 2012152357 | A | 8/2012 |
| JP | 2013105408 | A | 5/2013 |
| JP | 2019101653 | A | 6/2019 |
| JP | 2020032206 | A | 3/2020 |
| WO | WO 2015089451 | A1 | 6/2015 |

OTHER PUBLICATIONS

Tencent Technology, IPRP, PCT/CN2022/122479, Apr. 23, 2024, 6 pgs.

Wilderness Action Strategy Team, "[Wilderness Action] Explanation of "Instant Kill Mode"! Take Advantage of the Key Techniques of Sniping"! Dec. 2018, Retrieved from the Internet: https://web.archive.org/web/20190407044505/https://gamewith.jp/knives-out/article/show/109698.

Nanpa-no1.com, "A Detailed Introduction to How to Sprint (Dash and Run) in PUBG Mobile"! Jun. 2018, Retrieved from the Internet: https://nanpa-no1.com/pubgmobile-sprint/.

YouTube.com, "[Wilderness Action] If You Don't Know, it's a Loss! Explanation of the Advantages of Using "Instant Kill Mode"! If You Can Use it, SR Warriors is Natural"! [Knives Out Live Commentary], Apr. 2018, Retrieved from the Internet: https://www.youtube.com/watch?v=AmDJSeQuvOg.

Compri.jp.com. [PUBG Mobile] Introducing the Recommended Button Layout for iPad (4 fingers), Dec. 2018, Retrieved from the Internet: https://b.hatena.ne.jp/hotentry/game.

Tencent Technology, ISR, PCT/CN2022/122479, Jan. 6, 2023, 3 pgs.

* cited by examiner

VIRTUAL OBJECT CONTROL METHOD AND APPARATUS, TERMINAL, STORAGE MEDIUM, AND PROGRAM PRODUCT

CROSS-REFERENCE TO RELATED APPLICATIONS

This application is a continuation application of PCT Patent Application No. PCT/CN2022/122479, entitled "VIRTUAL OBJECT CONTROL METHOD AND APPARATUS, TERMINAL, STORAGE MEDIUM, AND PROGRAM PRODUCT" filed on Sep. 29, 2022, which claims priority to (i) Chinese Patent Application No. 202111221286.2, entitled "VIRTUAL OBJECT CONTROL METHOD AND APPARATUS, TERMINAL, STORAGE MEDIUM, AND PROGRAM PRODUCT" filed on Oct. 20, 2021 and (ii) Chinese Patent Application No. 202111653411.7, entitled "VIRTUAL OBJECT CONTROL METHOD AND APPARATUS, TERMINAL, STORAGE MEDIUM, AND PROGRAM PRODUCT" filed on Dec. 30, 2021, all of which are incorporated by reference in their entirety.

FIELD OF THE TECHNOLOGY

Embodiments of this application relate to the field of human-computer interaction technologies, and in particular, to a virtual object control method and apparatus, a terminal, a storage medium, and a program product.

BACKGROUND OF THE DISCLOSURE

In shooting games, a user may control a virtual object to attack an enemy virtual object by using a virtual prop, thereby eliminating the enemy virtual object and winning the game.

When controlling the virtual object to attack, the user may control the virtual object to be in a fixed posture to attack. However, if the virtual object maintains the fixed posture to attack, the virtual object is also be attacked by the enemy virtual object when attacking. Therefore, the user also controls the virtual object to move while controlling the virtual object to attack, thereby reducing the probability that the virtual object is attacked by the enemy virtual object. In the process of controlling the virtual object to attack and move, the user needs to press and hold with one finger and frequently drag a virtual joystick to control the virtual object to move, press and hold an attack control with one finger to control the virtual object to attack, and adjust the perspective through a drag operation with one finger, which require cooperation of multiple fingers.

However, when a virtual object is controlled to attack and move simultaneously through a multi-finger operation, fingers need to frequently and accurately click different controls, so that the operation is very complex and there are high operation requirements for a user.

SUMMARY

Embodiments of this application provide a virtual object control method and apparatus, a terminal, a storage medium, and a program product. Technical solutions are as follows:

According to one aspect, the embodiments of this application provide a virtual object control method, performed by a terminal. The method includes:

displaying a virtual environment picture and an attack control, the virtual environment picture containing a virtual object, and the attack control being configured to trigger the virtual object to attack;

in response to a first trigger operation on the attack control, displaying an action control adjacent the attack control, the action control being configured to trigger the virtual object to perform a non-attack action; and in response to a second trigger operation on the action control, controlling the virtual object to perform a first action according to the action control while performing attacks according to the attack control.

According to another aspect, the embodiments of this application provide a terminal. The terminal includes a processor and a memory. The memory stores at least one program, the at least one program being configured to be executed by the processor and causing the terminal to implement the virtual object control method according to the above aspect.

According to another aspect, a non-transitory computer-readable storage medium is provided. The computer-readable storage medium stores at least one program, the at least one program is configured to be executed by a processor of a terminal and causing the terminal to implement the virtual object control method according to the above aspect.

In the embodiments of this application, after the attack control is improved, when receiving the first trigger operation on the attack control, in addition to controlling the virtual object to attack, the terminal also displays the action control adjacent the attack control, and by performing the second trigger operation on the attack control, the user may control the virtual object to attack and perform actions indicated by the action control simultaneously, that is, by performing a two-stage trigger operation on the attack control, the virtual object is controlled to attack and perform the actions other than the attack simultaneously, thereby reducing the quantity of controls required to control the virtual object to attack and perform the actions, thus reducing the operation difficulty of the user. Moreover, the user may control the virtual object to attack and perform actions simultaneously with just one finger, thereby improving the operation efficiency of the user, and the terminal only needs to receive the trigger operations on the same position at the same time for data processing, thereby reducing the amount of data processing of the terminal.

DESCRIPTION OF EMBODIMENTS

Figure 1:
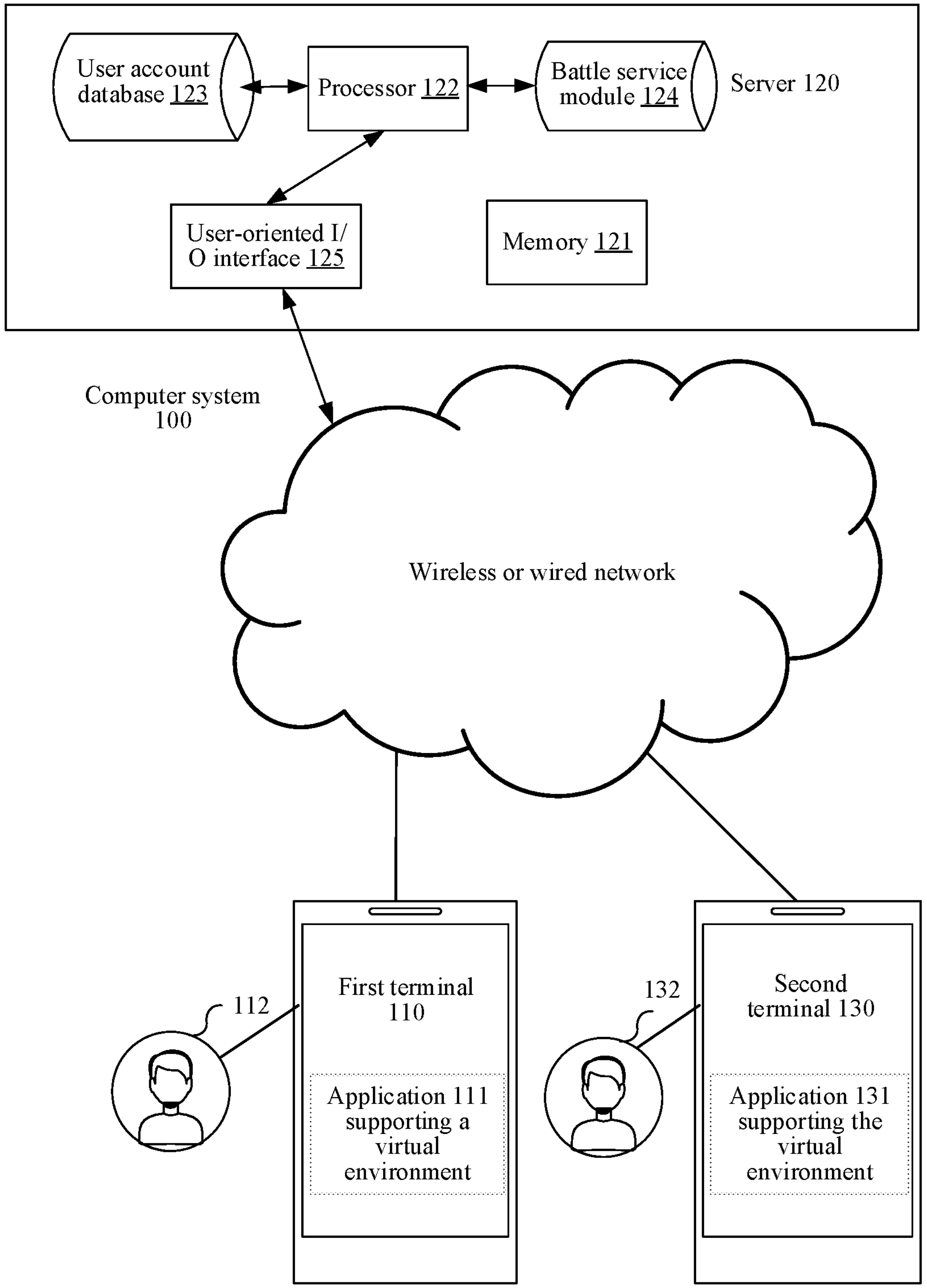
FIG. 1 is a schematic diagram of an implementation environment according to an embodiment of this application.

FIG. 1 is a schematic diagram of an implementation environment according to an embodiment of this application. The implementation environment may include a first terminal 110, a server 120, and a second terminal 130.

The first terminal 110 runs an application 111 supporting a virtual environment, and when the first terminal runs the application 111, a user interface of the application 111 is displayed on a screen of the first terminal 110. The application 111 may be any one of a multiplayer online battle arena (MOBA) game, a battle royale shooter game, or a simulation game (SLG). In this embodiment, illustration is performed by taking an example of the application 111 being a role-playing game (RPG). The first terminal 110 is a terminal used by a first user 112, the first user 112 controls a first virtual object located in the virtual environment to move by using the first terminal 110, and the first virtual object may be referred to as a main control virtual object of the first user 112. The movement of the first virtual object include, but is not limited to: at least one of adjusting the body posture, crawling, walking, running, riding, flying, jumping, driving, picking, shooting, attacking, throwing, and casting a skill. Schematically, the first virtual object is a first virtual character, such as a simulated character or an anime character.

The second terminal 130 runs an application 131 supporting the virtual environment, and when the second terminal 130 runs the application 131, a user interface of the application 131 is displayed on a screen of the second terminal 130. The client may be any one of an MOBA game, a battle royale shooter game, or an SLG game. In this embodiment, illustration is performed by taking an example of the application 131 being an RPG. The second terminal 130 is a terminal used by a second user 132, the second user 132 controls a second virtual object located in the virtual environment to move by using the second terminal 130, and the second virtual object may be referred to as a main control virtual character of the second user 132. Schematically, the second virtual object is a second virtual character, such as a simulated character or an anime character.

In some embodiments, the first virtual object and the second virtual object are in the same virtual world. In some embodiments, the first virtual object and the second virtual object may belong to the same camp, the same team or the same organization, have a friend relationship, or have temporary communication permission. In some embodiments, the first virtual object and the second virtual object may belong to different camps, different teams or different organizations, or have an adversarial relationship. In the embodiment of this application, illustration is performed by an example of the first virtual object and the second virtual object belonging to the same camp.

In some embodiments, the applications run on the first terminal 110 and the second terminal 130 are the same, or the applications run on the two terminals are the same type of applications on different operating system platforms (Android or IOS). The first terminal 110 may generally refer to one of multiple terminals, and the second terminal 130 may generally refer to another of the multiple terminals. In this embodiment, illustration is performed only by an example of the first terminal 110 and the second terminal 130. The device types of the first terminal 110 and the second terminal 130 are the same or different. The device types include: at least one of a smartphone, a tablet computer, an e-book reader, an MP3 player, an MP4 player, a laptop computer, and a desktop computer.

Only two terminals are shown in FIG. 1, but there are multiple other terminals that may access the server 120 in different embodiments. In some embodiments, there are one or more terminals corresponding to a developer, a development and editing platform for an application supporting the virtual environment is installed on the terminal, the developer may edit and update the application on the terminal, and transmit an updated application installation package to the server 120 through a wired or wireless network, and the first terminal 110 and the second terminal 130 may download the application installation package from the server 120 to update the application.

The first terminal 110, the second terminal 130, and the other terminals are connected to the server 120 through the wireless or wired network.

The server 120 includes at least one of a server, a server cluster composed of multiple servers, a cloud computing platform, and a virtual center. The server 120 is configured to provide a backend service for an application supporting a 3D virtual environment. In some embodiments, the server 120 undertakes the primary computing work and the terminal undertakes the secondary computing work; or the server 120 undertakes the secondary computing work and the terminal undertakes the primary computing work; or the server 120 and the terminal perform collaborative computing by using a distributed computing architecture.

In a schematic example, the server 120 includes a memory 121, a processor 122, a user account database 123, a battle service module 124, and a user-oriented input/output (I/O) interface 125. The processor 122 is configured to load an instruction stored in the server 120, and process data in the user account database 123 and the battle service module 124. The user account database 123 is configured to store data of user accounts used by the first terminal 110, the second terminal 130, and the other terminals, such as avatars of the user accounts, nicknames of the user accounts, battle effectiveness indexes of the user accounts, and service areas where the user accounts are located. The battle service module 124 is configured to provide multiple battle rooms for users to battle, such as 1V1 battle, 3V3 battle, and 5V5 battle. The user-oriented I/O interface 125 is configured to establish communication with the first terminal 110 and/or the second terminal 130 through the wireless or wired network to exchange data.

Figure 2:
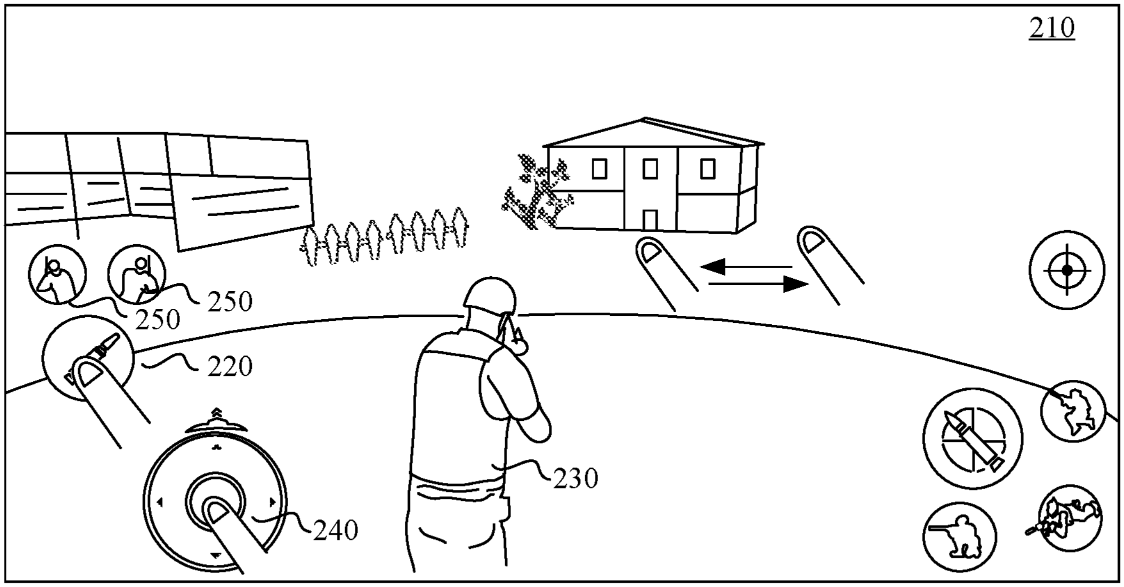
FIG. 2 is a schematic diagram of a multi-finger operation according to an embodiment of this application.

In the related art, cooperation of multiple fingers is required for a user to control a virtual object to attack, and at the same time control the virtual object to perform actions other than the attack. As shown in FIG. 2, when controlling a virtual object 230 to shoot, a user needs to press and hold an attack control 220 with one finger. If needing to control the virtual object 230 to move during the shooting, the user needs to drag a virtual joystick control 240 with another finger, and slide in a virtual environment picture with use another finger to adjust the perspective of the virtual object 230.

If needing to control the virtual object 230 to perform action switching during the shooting, for example, to control the virtual object 230 to peek left and right during an attack, the user needs to click on a left/right peeking action control 250 with another finger, and slide in the virtual environment picture with another finger to adjust the perspective of the virtual object 230.

In order to reduce the operation difficulty of the user controlling the virtual object to attack and perform other actions simultaneously, in the embodiment of this application, the attack control 220 is improved, so that the attack control 220 not only has the function of controlling the virtual object to attack, but also has the function of controlling the virtual object to perform other actions. When the user performs a first trigger operation on the attack control 220, the attack control 220 may display an action control on the periphery of the attack control 220 while controlling the virtual object 230 to shoot, and when the user continues to perform a second trigger operation on the attack control 220, the attack control 220 may control the virtual object 230 to perform an action indicated by the action control while attacking.

A virtual firearm, a virtual bullet, a virtual dagger, a virtual ax, a virtual sickle, a virtual grenade, a virtual smoke bomb, etc. involved in the embodiment of this application are all virtual props in a virtual game.

Figure 3:
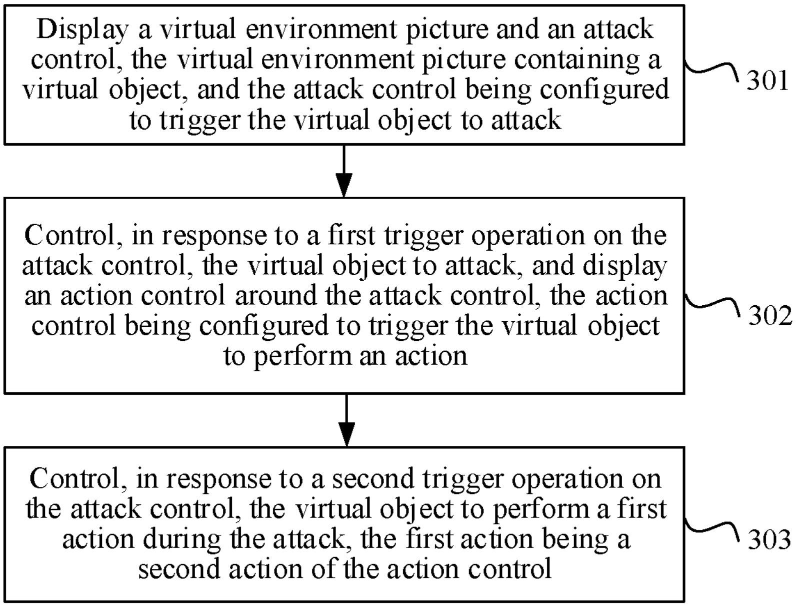
FIG. 3 is a flowchart of a virtual object control method according to an embodiment of this application.

FIG. 3 is flowchart of a virtual object control method according to an embodiment of this application. In this embodiment, illustration is performed by an example of the method being used in the first terminal 110 or the second terminal 130 in an implementation environment shown in FIG. 1, or the other terminals in the implementation environment. The method includes:

Step 301: Display a virtual environment picture and an attack control, the virtual environment picture containing a virtual object, and the attack control being configured to trigger the virtual object to attack.

In some embodiments, the virtual environment picture is a picture that observes a virtual environment from the perspective of a virtual object. In some embodiments, the perspective of the virtual object may be either a first-person or a third-person perspective. The virtual environment picture displays elements in the virtual environment, such as a virtual building, a virtual prop, and other virtual objects.

In one possible implementation, the attack control is displayed on an upper layer of the virtual environment picture, and a user may control the virtual object to attack through a trigger operation on the attack control. The virtual object is an active virtual object of the user.

In some embodiments, controlling the virtual object to attack through the attack control may be controlling the virtual object to attack directly, for example, to attack by using body parts such as a first or a foot, or controlling the virtual object to attack by using a virtual prop, for example, controlling the virtual object to attack by using a virtual firearm or a virtual grenade. This is not limited in the embodiment of this application.

In the embodiment of this application, the terminal displays the virtual environment picture and a control display layer located above the virtual environment picture. The virtual environment picture is a display picture corresponding to the virtual environment, and used for displaying the virtual environment and the elements located in the virtual environment. The control display layer is used for displaying an operation control (including the attack control) to implement a human-computer interaction function. In some embodiments, the operation control may include a button, a slider, a slide bar, or the like. This is not limited in the embodiment of this application.

Step 302: Control, in response to a first trigger operation on the attack control, the virtual object to attack, and display an action control adjacent the attack control, the action control being configured to trigger the virtual object to perform an action (e.g., a non-attack action).

In one possible implementation, when the user performs the first trigger operation on the attack control, the terminal controls the virtual object to attack. In some embodiments, the virtual object may attack directly or by using a virtual prop, the attack object of the virtual object may be either an enemy virtual object or a non-enemy virtual object.

In order to reduce the operation cost of the user controlling the virtual object to attack and perform other actions simultaneously, in one possible implementation, the attack control is improved, when the terminal receives the first trigger operation on the attack control, in addition to controlling the virtual object to attack, the terminal also displays the action control adjacent the attack control by taking the attack control as a center, and actions supported by the action control include actions other than the attack action, so that the attack control may also trigger the virtual object to perform actions other than the attack.

In some embodiments, the first trigger operation may be a click operation, a press and hold operation, a press operation, or the like on the attack control. This is not limited in the embodiment of this application.

In some embodiments, the action control may control the virtual object to adjust the field of view, or may control the virtual object to move, or may control the virtual object to perform some particular actions, such as peeking, jumping, and lying face-down. This is not limited in the embodiment of this application.

Step 303: Control, in response to a second trigger operation on the action control, the virtual object to perform a first action according to the action control while performing attacks according to the attack control.

Since the action control is displayed around the attack control, the virtual object may be triggered to perform the action during the attack by the second trigger operation on the attack control. In one possible implementation, when the user performs the second trigger operation on the attack control, such as performing a drag operation on the attack control, the terminal may determine a corresponding second action in a direction of the drag operation as the first action and control the virtual object to perform the first action during the attack. The first action is the second action corresponding to the action control.

In some embodiments, the second trigger operation may be a drag operation, a slide operation, or the like on the attack control. This is not limited in the embodiment of this application. In some embodiments, the second trigger operation and the first trigger operation are two continuous trigger operations, for example, the first trigger operation is a press and hold operation on the attack control, the second trigger operation is a drag operation on the attack control, and the press and hold operation and the drag operation are continuous.

In some embodiments, if the terminal does not continuously receive the second trigger operation after receiving the first trigger operation on the attack control, that is, if the trigger operation is stopped after the first trigger operation, correspondingly the terminal stops controlling the virtual object to attack.

Schematically, when the action control displayed around the attack control is configured to control and adjust the field of view of the virtual object, when the user performs the second trigger operation on the attack control, the field of view is also adjusted according to the second trigger operation while the virtual object attacks. When the action control displayed on the periphery of (around) the attack control is configured to control the virtual object to move, when the attack control receives the second trigger operation, the virtual object may move according to the second trigger operation while attacking. When the action control displayed on the periphery of (around) the attack control is configured to control the virtual object to perform some particular actions, such as peeking, jumping, and lying face-down, when the attack control receives the second trigger operation, the virtual object may perform a selected particular actions while attacking, for example, if the selected particular action is jumping, the virtual object may attack while jumping.

In some embodiments, multiple types of action controls may be displayed simultaneously around the attack control, such as an action control for adjusting the field of view of the virtual object, an action control for controlling the virtual object to move, and an action control for controlling the virtual object to perform some particular actions, and display positions of different action controls are different, so that the user drags the attack control to different positions to control the virtual object to perform different types of actions. In some embodiments, only a single type of action control is displayed around the attack control at the same time, and by switching an action control mode, the action control displayed after being triggered may be switched.

In some embodiments, the control of the virtual object may be executed by the terminal, that is, when receiving the trigger operation, the terminal controls, based on the trigger operation, the virtual object to attack and perform an action; alternatively, the control of the virtual object may be executed by a server, that is, the terminal reports the received trigger operation to the server, the server is responsible for controlling, based on the trigger operation, the virtual object to attack and perform the action, and feeds back the result of the virtual object attacking and performing the action to the terminal, and the result is displayed by the terminal; alternatively, the control of the virtual object may be collaboratively executed by the terminal and the server, that is, the terminal reports the received trigger operation to the server, the server feeds back a control instruction for the virtual object based on the trigger operation, and finally, the terminal controls the virtual object to attack and perform the action based on the control instruction.

In summary, in the embodiment of this application, after the attack control is improved, when receiving the first trigger operation on the attack control, in addition to controlling the virtual object to attack, the terminal also displays the action control adjacent the attack control, and by performing the second trigger operation on the attack control, the user may control the virtual object to attack and perform actions indicated by the action control simultaneously, that is, by performing a two-stage trigger operation on the attack control, the virtual object is controlled to attack and perform the actions other than the attack simultaneously, thereby reducing the quantity of controls required to control the virtual object to attack and perform the actions, thus reducing the operation difficulty of the user. Moreover, the user may control the virtual object to attack and perform actions simultaneously with just one finger, thereby improving the operation efficiency of the user, and the terminal only needs to receive the trigger operations on the same position at the same time for data processing, thereby reducing the amount of data processing of the terminal.

In different scenes, the actions that the virtual object needs to perform simultaneously during the attack may be different. For example, in a movement and attack scene, the user needs to control the virtual object to move during the attack; in a cover attack scene, the user needs to control the virtual object to peek during the attack. Therefore, in the embodiment of this application, different action modes are set for different scenes, so that the virtual object may perform different types of actions in different action modes.

Figure 4:
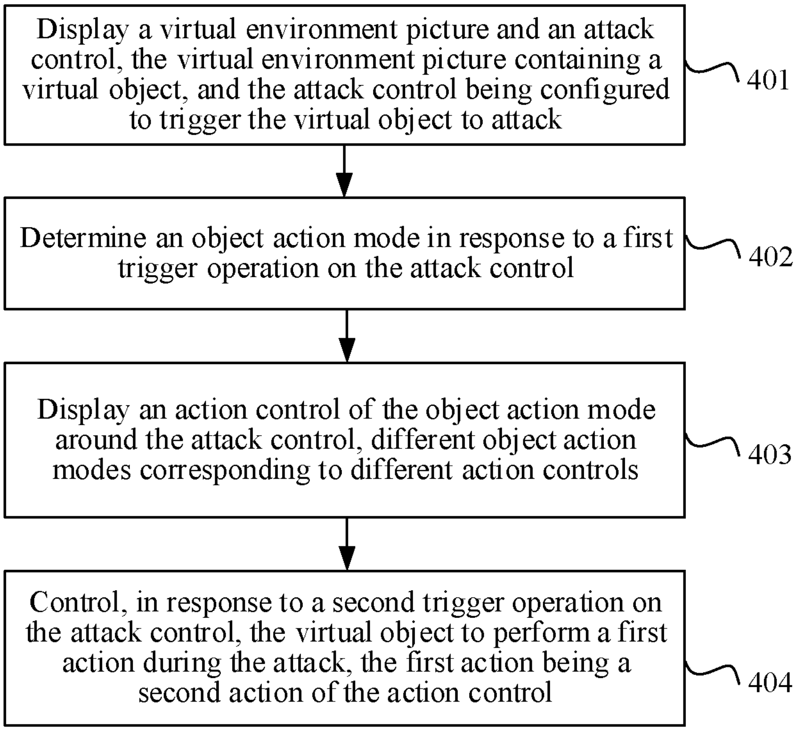
FIG. 4 is a flowchart of a virtual object control method according to another embodiment of this application.

FIG. 4 is a flowchart of a virtual object control method according to another embodiment of this application. In this embodiment, illustration is performed by an example of the method being used in the first terminal 110 or the second terminal 130 in the implementation environment shown in FIG. 1, or the other terminals in the implementation environment. The method includes:

Step 401: Display a virtual environment picture and an attack control, the virtual environment picture containing a virtual object, and the attack control being configured to trigger the virtual object to attack.

This step is the same as step 301 above, and the details are not described herein in the embodiment of this application.

Step 402: Determine an action control mode in response to a first trigger operation on the attack control.

The object action mode refers to an action type of an action performed by the virtual object during a game battle. In one possible implementation, there may be multiple object action modes during the game battle, and the terminal needs to determine an action control mode to be performed from the multiple object action modes before the virtual object attacks, so as to display an action control corresponding to the object action mode on the periphery of the attack control based on the determined object action mode.

In some embodiments, the object action mode may include an action mode that controls the virtual object to adjust the field of view, or an action mode that controls the virtual object to move, or an action mode that controls the virtual object to perform particular actions, such as lying face-down, squatting, peeking left, and peeking right, and the specific type of the object action mode is not limited in the embodiment of this application.

In some embodiments, the object action mode may be a default action mode set by the terminal by default, or may be an action mode set by the user based on an actual battle situation. This is not limited in the embodiment of this application.

In some embodiments, in order to facilitate the user to select a desired object action mode, a mode switching control is also provided, so that the user switches to the desired object action mode through a trigger operation on the mode switching control, such that after the trigger operation is performed on the attack control, the action control in the corresponding object action mode may be displayed.

In some embodiments, the mode switching control may be displayed around the attack control, so that the user easily switches the object action mode when using the attack control.

In some embodiments, if both the mode switching control and the action control are displayed around (on the periphery of) the attack control, in order to avoid the impact of the mode switching control on a subsequent action control, the terminal may hide the mode switching control while displaying the action control after receiving the first trigger operation on the attack control, to prevent the mode switching control from blocking the action control.

In some embodiments, after the second trigger operation is ended, in order to facilitate the user to switch the object action mode, the display mode switching control may be resumed.

Step 403: Display the action control of the object action mode adjacent the attack control, different object action modes corresponding to different action controls.

Since in different object action modes, actions to be performed by the virtual object all contain multiple action options, for example, in the action mode that controls the virtual object to move, it may be necessary to control the virtual object to move left, right, up, or down, etc., in order to accurately implement the action control of the virtual object, special action controls are set for different object action modes, and correspondingly, after the first trigger operation on the attack control is received in different object action modes, different motion controls may be displayed around the attack control.

Step 404: Control, in response to a second trigger operation on the action control, the virtual object to perform a first action according to the action control while performing attacks according to the attack control.

In different object action modes, different action controls are displayed on the periphery of the attack control, and different action controls are configured to trigger the virtual object to perform different types of actions. Therefore, in one possible implementation, when receiving a second trigger operation on the attack control, the virtual object may be controlled to perform the first action indicated by the action control during the attack.

In the embodiment of this application, illustration is performed by an example of the object action mode including a first action mode and a second action mode. In the first action mode, step 403 and step 404 may be replaced with step 403A and step 404A; and in the second action mode, step 403 and step 404 may be replaced with step 403B, step 404B and step 404C.

Step 403A: Display, when the object action mode is the first action mode, a virtual joystick control around the attack control by taking the attack control as a center, the virtual joystick control being configured to control the virtual object to move.

The first action mode is a movement mode, that is, an action mode that controls the virtual object to move in various directions. For example, in the first action mode, the virtual object may be controlled to move left, right, up, down, etc. in a virtual environment by triggering the action control.

When the object action mode is the first action mode, when receiving the first trigger operation on the attack control, the terminal may display a virtual joystick control around the attack control by taking the attack control as a center, and the virtual joystick may control the virtual object to move forward, backward, left, and right in the virtual environment. By the user operates the virtual joystick control, the terminal may control the virtual object to move in a direction corresponding to the virtual joystick control while attacking.

Figure 5:
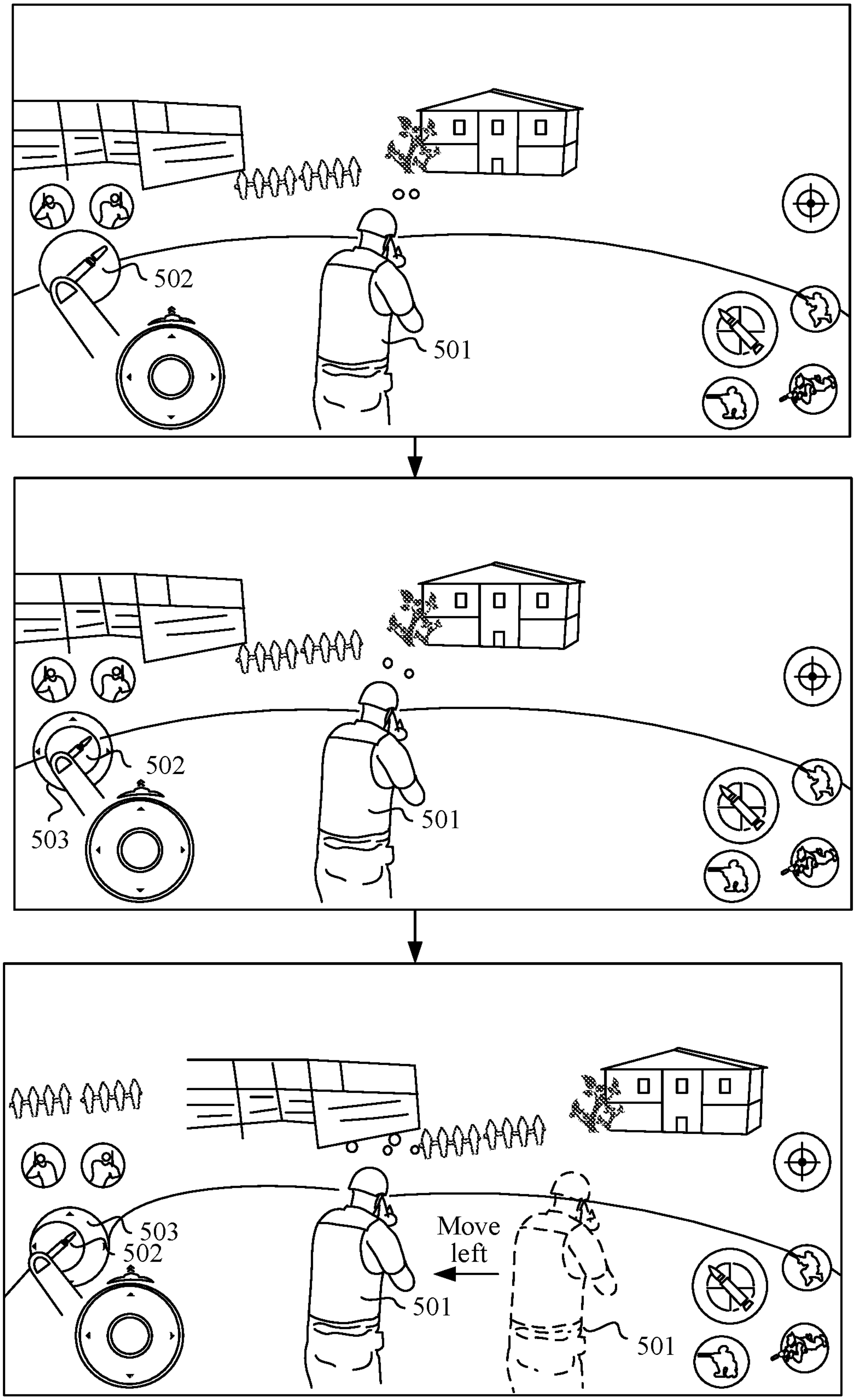
FIG. 5 is an implementation schematic diagram of a virtual object control process in a first action mode according to an embodiment of this application.

Schematically, as shown in FIG. 5, an attack control 502 (in the form of a button) is displayed on an upper layer of a virtual environment picture. When the object action mode is the first action mode, when the user presses and holds the attack control 502, the terminal displays a virtual joystick control 503 on the periphery of (around) the attack control 502; and the virtual joystick control 503 displays moving sub-controls in four directions around the attack control by taking the attack control as a center.

Step 404A: Control, in response to a drag operation on the attack control, the virtual object to move during the attack based on a drag direction of the drag operation.

In some embodiments, when the terminal receives the drag operation on the attack control, the terminal may control the virtual object to move in the drag direction of the drag operation while attacking. For example, after the terminal receives a press and hold operation (the first trigger operation) on the attack control, a left drag operation (the second trigger operation) on the attack control is continued when the virtual joystick control is displayed, and then the virtual object may be controlled to move left while attacking. The press and hold operation and the drag operation are continuous operations.

Schematically, as shown in FIG. 5, when a user drags the attack control 502 to the left, a virtual object 501 may move to the left while attacking.

Obviously, after the attack control is improved, the user only needs to operate a single control to control the virtual object to move and attack (single-finger operation), without operating both the attack control and the virtual joystick control (multi-finger operation), thereby reducing the operation difficulty of the movement and attack.

Figure 6:
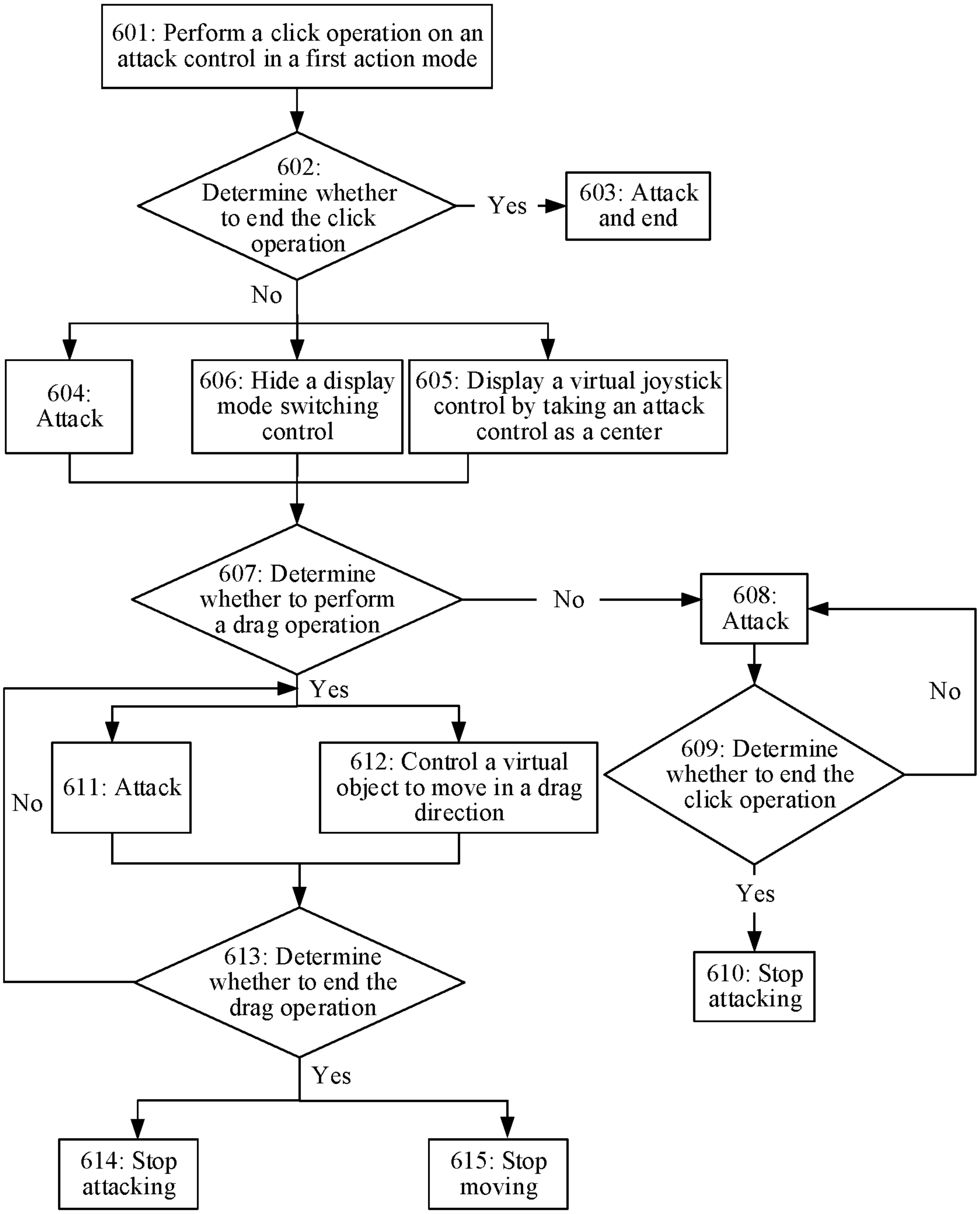
FIG. 6 is a work flowchart of a first action mode according to an embodiment of this application.

FIG. 6 is a work flowchart of a first action mode according to an embodiment of this application. The process includes steps 601 to 615.

Step 601: Perform a click operation on an attack control in the first action mode.

The first action mode is a movement mode, which controls a virtual object to move in various directions.

Step 602: Determine whether to end the click operation.

When an action control mode is a movement mode, the click operation is performed on the attack control. In this case, it is necessary to determine whether the user ends the click operation on the attack control. If the user ends the click operation on the attack control in this case, step 603 is performed to shoot and end. If the user continues performing the click operation on the attack control in this case, steps 604 to 614 are performed.

When the user continues performing the click operation on the attack control, step 604 and step 605 are performed to control the virtual object to continue attacking, and display the virtual joystick control by taking the attack control as a center.

Step 603: Attack and end.

When the user ends the click operation on the attack control, step 603 is performed to control the virtual object to stop attacking.

Step 604: Attack.

Step 605: Display a virtual joystick control by taking an attack control as a center.

When the terminal receives a continuous trigger operation on the attack control, the virtual joystick control may be displayed by taking the attack control as a center and attacking is continued.

Step 606: Hide a display mode switching control.

The display mode switching control may be hidden when the virtual joystick control is displayed.

In some embodiments, if there is no overlap region between a display region of the mode switching control and a display region of the virtual joystick control, the display mode switching control may not be left hidden; if there is an overlap region between a display region of the mode switching control and a display region of the virtual joystick control, the display mode switching control may be hidden.

Step 607: Determine whether to perform a drag operation.

It is determined whether the user performs the drag operation on the attack control. If the user does not perform the drag operation on the attack control, steps 608 to 610 are performed.

Step 608: Attack.

When the user does not perform the drag operation on the attack control and still maintains the click or press operation on the attack control, step 608 is performed to control the virtual object to continue attacking.

Step 609: Determine whether to end the click operation.

Step 610: Stop attacking.

It is further determined whether the user ends the click operation on the attack control. If the user does not end the click operation on the attack control, step 608 is continued to control the virtual object to attack continuously. If the user ends the click operation on the attack control, the virtual object is controlled to perform step 610 to stop attacking.

When the user performs the drag operation on the attack control, step 611 and step 615 are performed to control the virtual object to move in a drag direction while controlling the virtual object to attack.

Step 611: Attack.

Step 612: Control the virtual object to move in the drag direction.

Step 613: Determine whether to end the drag operation.

It is further determined whether the user ends the drag operation on the attack control. If the user does not end the drag operation on the attack control, step 611 and step 612 are continued; if the user ends the drag operation on the attack control, step 614 and step 615 are performed to control the virtual object to stop attacking and stop moving.

Step 614: Stop attacking.

Step 615: Stop moving.

Step 403B: Display, when the object action mode is the second action mode, a virtual wheel control around the attack control by taking the attack control as a center, the virtual wheel control being divided into at least two first wheel sub-regions located at different positions, and an action option of the second action being displayed in each first wheel sub-region.

The second action mode is a particular movement mode, that is, an action mode that controls the virtual object to perform particular actions. For example, in the second action mode, the virtual object may be controlled to perform particular actions such as lying face-down, squatting, peeking left, and peeking right by triggering the action control.

In some embodiments, when switching between the first action mode and the second action mode is performed through the mode switching control, if the current object action mode is the first action mode, when the trigger operation on the mode switching control is received, the first action mode may be switched to the second action mode; if the current object action mode is the second action mode, when the trigger operation on the mode switching control is received, the second action mode may be switched to the first action mode.

When the object action mode is the second action mode, the terminal may display a virtual wheel control on the periphery of (around) the attack control by taking the attack control as a center, the virtual wheel control may be divided into several first wheel sub-regions located at different positions, and an action option of the second action is displayed in each first wheel sub-region.

Figure 7:
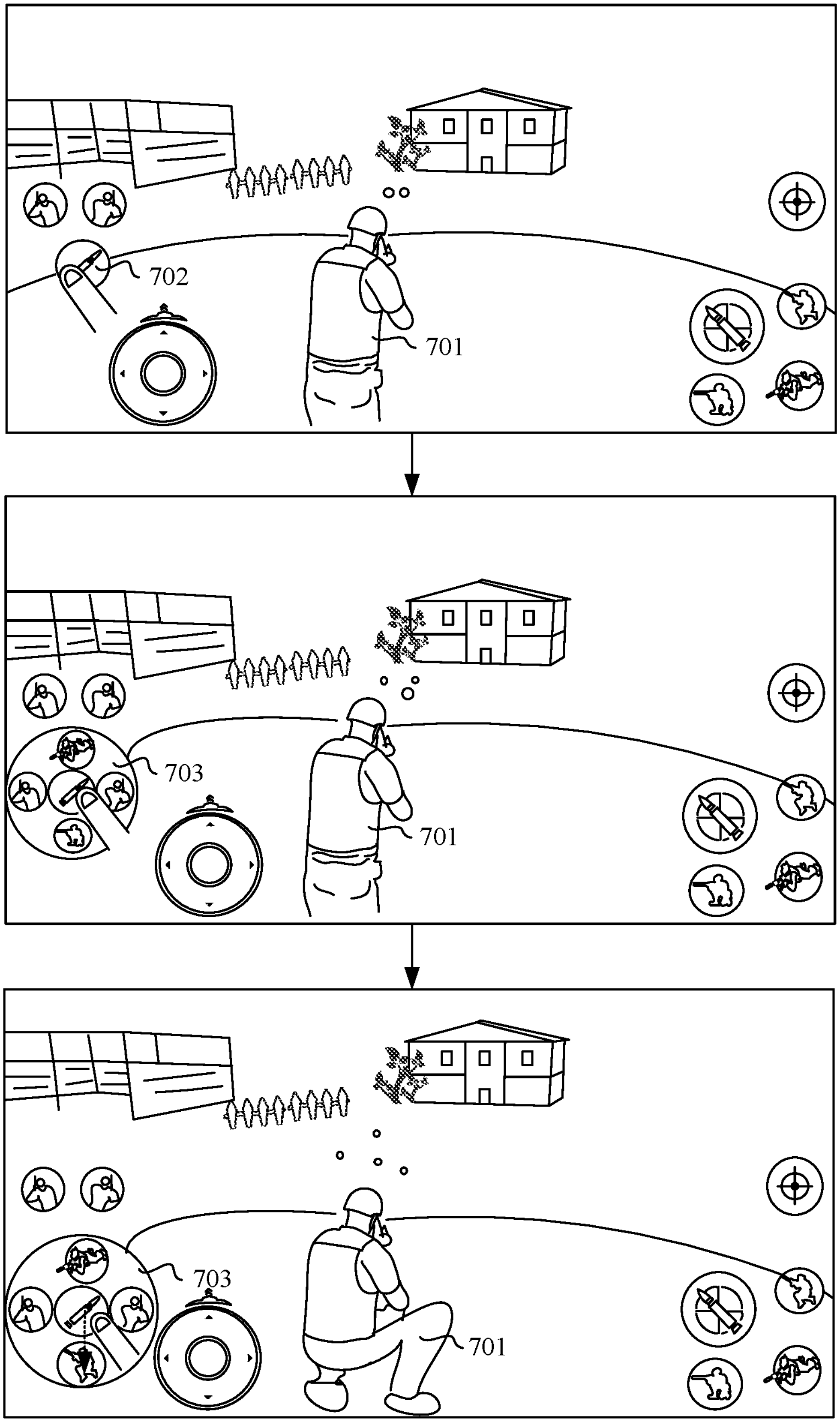
FIG. 7 is an implementation schematic diagram of a virtual object control process in a second action mode according to an embodiment of this application.

Schematically, as shown in FIG. 7, when the object action mode is the second mode, the terminal displays a virtual wheel control 703 by taking an attack control 702 as a center, the virtual wheel control 703 is divided into four wheel sub-regions located at different positions, and an action option of a candidate action is displayed in each wheel sub-region. Candidate actions may be jumping, lying face-down, probing left and right, etc.

In some embodiments, the division mode and quantity of the first wheel sub-regions in the virtual wheel control may be set by the terminal, or by the user based on a battle situation or usage. This is not limited in the embodiment of this application. For example, the virtual wheel control may be divided into four first wheel sub-regions, and candidate actions such as jumping, lying face-down, peeking left, and peeking right are displayed in each first wheel sub-region.

Step 404B: Determine, in response to the drag operation on the attack control, a second wheel sub-region from the at least two first wheel sub-regions based on a control position of the attack control after dragging, the control position overlapping the second wheel sub-region.

After the virtual wheel control is displayed by taking the attack control as a center, the user may perform the drag operation on the attack control, and the terminal may determine the second wheel sub-region from the several first wheel sub-regions based on the control position of the dragged attack control. In this case, the control position of the attack control overlaps the position of the second wheel sub-region.

In some embodiments, when the virtual wheel control is displayed, if a display region of the virtual wheel control overlaps the display region of the mode switching control, the display mode switching control may be hidden while displaying the virtual wheel control.

As shown in FIG. 7, in the second action mode, the virtual wheel control 703 displayed on the periphery of the attack control 702 is divided into four different first wheel sub-regions at four different positions, i.e., top, bottom, left, and right, which correspond to candidate actions, i.e., lying face-down, squatting, peeking left, and peeking right, respectively. The user drags the attack control 702, for example, the user drags the attack control 702 downwards, and the terminal determines the second wheel sub-region, that is, the position displayed by a squat action control according to the position of the dragged attack control 702. In this case, the control position of the attack control 702 overlaps the position of the squat action control.

In some embodiments, if the control position of the dragged attack control overlaps the positions of two or more first wheel sub-regions, the terminal may determine the first wheel sub-region having the largest overlapping area as the second wheel sub-region.

Step 404C: Control the virtual object to perform a first action during the attack, the first action being a second action displayed in the second wheel sub-region.

After determining the second wheel sub-region, the terminal may control the virtual object to perform the corresponding second action during the attack according to the action option displayed in the second wheel sub-region.

Schematically, as shown in FIG. 7, in the second action mode, if the control position of the dragged attack control 702 coincides with the squat action control, the terminal controls the virtual object 701 to perform a squat action while controlling the virtual object 701 to attack.

In the process of dragging the attack control, since the control position of the attack control may temporarily overlap a non-target wheel sub-region, in order to prevent the virtual object from performing a first action corresponding to the non-target wheel sub-region, in one possible implementation, when a dwell duration of the attack control at the control position reaches a duration threshold, the terminal controls the virtual object to perform the second action corresponding to the second wheel sub-region during the attack. If the dwell duration of the attack control at the control position does not reach the duration threshold, the terminal determines the operation is a misoperation and does control the virtual object to perform the corresponding action. For example, the duration threshold is 0.2 s.

In some embodiments, in other possible implementations, during the attack by the virtual object, the user may control the virtual object to perform different actions through the drag operation on the attack control, such as jumping first and then lying face-down during the shooting; and then when performing the drag operation on the attack control, the user may first drag the attack control to the first wheel sub-region corresponding to a jumping action, and then drag the attack control to the second wheel sub-region corresponding to a lying face-down action.

Schematically, as shown in FIG. 7, the control position of the dragged attack control 702 coincides with the squat action control. In this case, it is necessary to determine whether the duration of the attack control 702 staying at the position of the squat action control is greater than or equal to the duration threshold, for example, staying on the action control for greater than 0.2 s. If the attack control 702 stays on the squat action control for greater than or equal to 0.2 s, the terminal controls the virtual object 701 to perform the squat action while controlling the virtual object 701 to attack.

In some embodiments, the duration threshold may be set by the terminal or by the user. This is not limited in the embodiment of this application.

Figure 8:
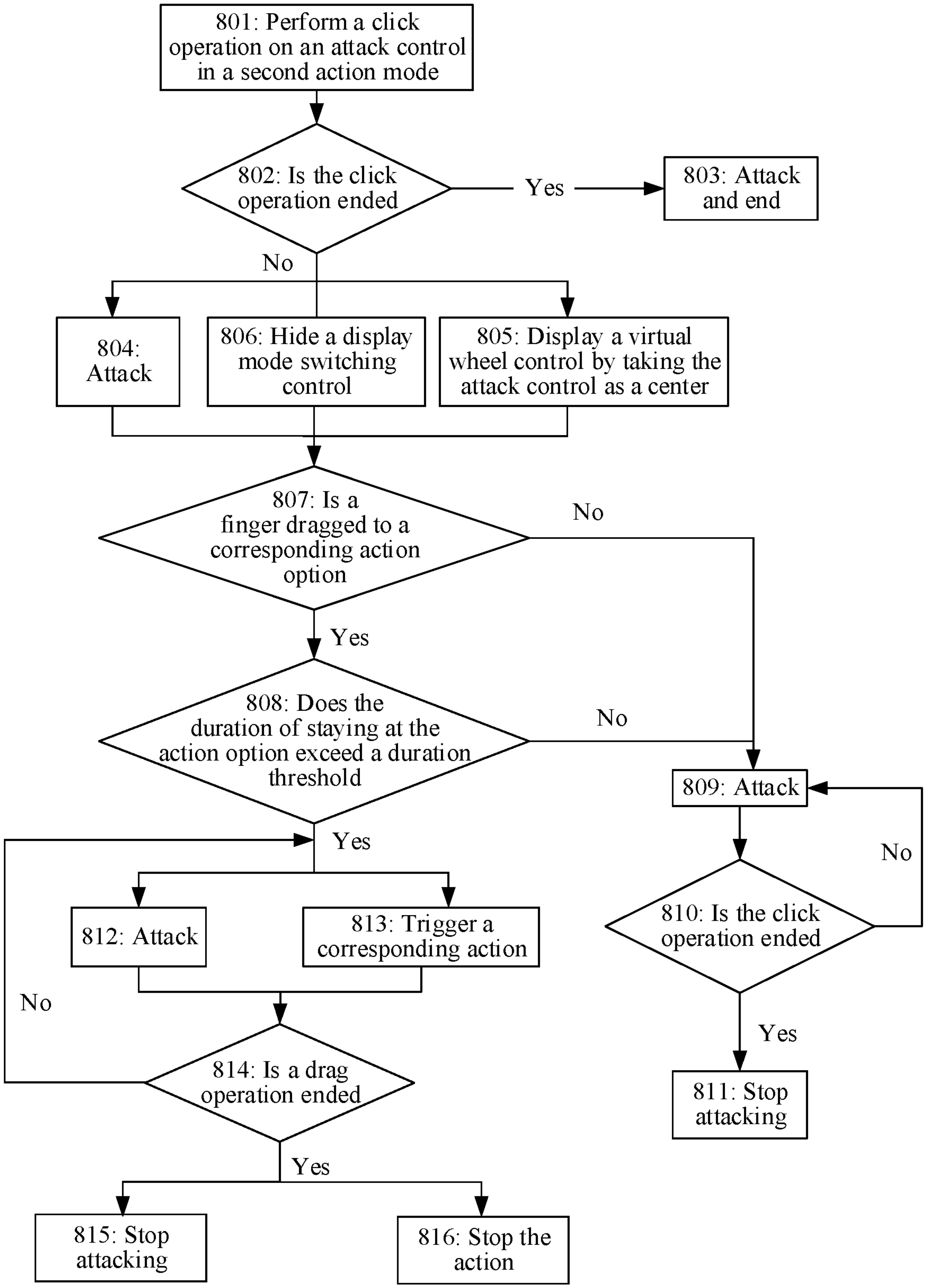
FIG. 8 is a work flowchart of a second action mode according to an embodiment of this application.

Schematically, FIG. 8 is a work flowchart of a second action mode according to an embodiment of this application. The process includes steps 801 to 816.

Step 801: Perform a click operation on an attack control in the second action mode.

The second action mode is a particular action mode, which controls a virtual object to perform different particular actions, for example, jumping, lying face-down, peeking left, peeking right, etc.

Step 802: Determine whether to end the click operation.

When an action control mode is the second action mode, the click operation is performed on the attack control. In this case, it is necessary to determine whether a user ends the click operation on the attack control. If the user ends the click operation on the attack control, step 803 is performed to attack and end.

If the user does not end the click operation on the attack control, steps 804 to 806 are performed to control the virtual object to attack, and display a virtual wheel control on the periphery of the attack control.

Step 803: Attack and end.

Step 804: Attack.

Step 805: Display the virtual wheel control by taking the attack control as a center.

Step 806: Hide a display mode switching control.

The display mode switching control may be hidden when the virtual wheel control is displayed.

In some embodiments, if there is no overlap region between a display region of the mode switching control and a display region of the virtual wheel control, the display mode switching control may not be hidden; if there is an overlap region between the display region of the mode switching control and the display region of the virtual wheel control, the display mode switching control may be hidden.

Step 807: Determine whether to drag a finger to a corresponding action option.

Step 808: Determine whether the duration of staying on the action option exceeds a duration threshold.

If the user does not end the click operation on the attack control, steps 807 and 808 are performed to determine whether the user drags the finger to the corresponding action option and determine whether the duration of staying on the action option exceeds the duration threshold. If the user does not drag the finger and the duration of not staying on the action option is less than the duration threshold, step 809 is performed to only control the virtual object to attack continuously.

Step 809: Attack.

Step 810: Determine whether to end the click operation.

Step 811: Stop attacking.

Step 810 is performed to determine whether the user ends the click operation on the attack control. If the user ends the click operation on the attack control, step 811 is performed to control the virtual object to stop attacking, and if the user does not end the click operation on the attack control, step 809 is performed to control the virtual object to continue attacking.

When the user drags the finger to the corresponding action option and the duration of staying on the action option exceeds the duration threshold, steps 812 to 816 are performed.

Step 812: Attack.

Step 813: Trigger a corresponding action.

If the user drags the finger to the corresponding action option and the duration of staying on the action option exceeds the duration threshold, the virtual object is controlled to perform the action corresponding to the action option while controlling the virtual object to attack.

Step 814: Determine whether to end the drag operation.

Step 814 is performed to determine whether the user ends the drag operation on the attack control. If the user ends the drag operation on the attack control, step 815 and step 816 are performed to control the virtual object to stop attacking and stop performing the action; if the user does not end the drag operation on the attack control, step 812 and step 813 are continued to control the virtual object to attack and perform the corresponding action.

Step 815: Stop attacking.

Step 816: Stop the action.

In this embodiment, the terminal may display different action controls on the periphery of (around) the attack control according to different object action modes. For example, in a first action mode, a virtual joystick control may be displayed on the periphery of the attack control to control the virtual object to move, and in a second action mode, the virtual wheel control may be displayed on the periphery of the attack control to control the virtual object to perform particular actions. Displaying different action controls for different object action modes is beneficial for meeting the different requirements of the user for action controls at different moments during a game battle, or meeting the requirements of the user for different types of actions performed on the virtual object at different moments. The embodiment of this application only provides an exemplary explanation of the two action modes above. The terminal may also set other action modes as required, such as a third action mode, and the corresponding action control is a field-of-view adjustment control. Through a trigger operation on the control, the terminal may adjust the field of view while controlling the virtual object to attack. The embodiment of this application does not limit the specific object action mode or the action control displayed in the object action mode.

Figure 9:
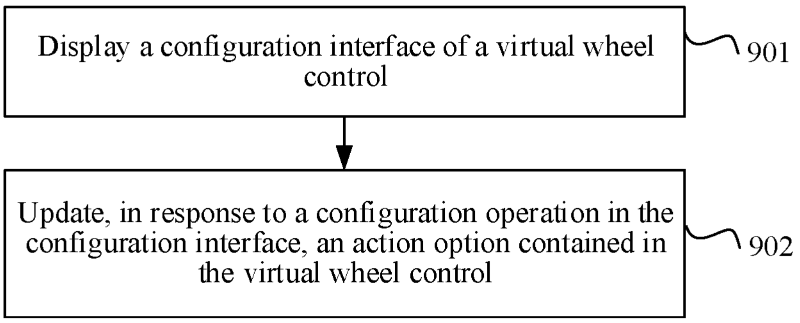
FIG. 9 is a flowchart of a virtual wheel control configuration process according to an embodiment of this application.

In one possible implementation, the user may perform operations such as replacing, adding, and deleting on action options (a second action and a first action) in a wheel sub-region of the virtual wheel control through a configuration interface. FIG. 9 is a flowchart of a virtual wheel control configuration process according to an exemplary embodiment of this application.

Step 901: Display a configuration interface of a virtual wheel control.

The configuration interface of the virtual wheel control is displayed, and a user may perform a series of operations such as removing, adding, and updating on a candidate action displayed in the virtual wheel control.

Figure 10:
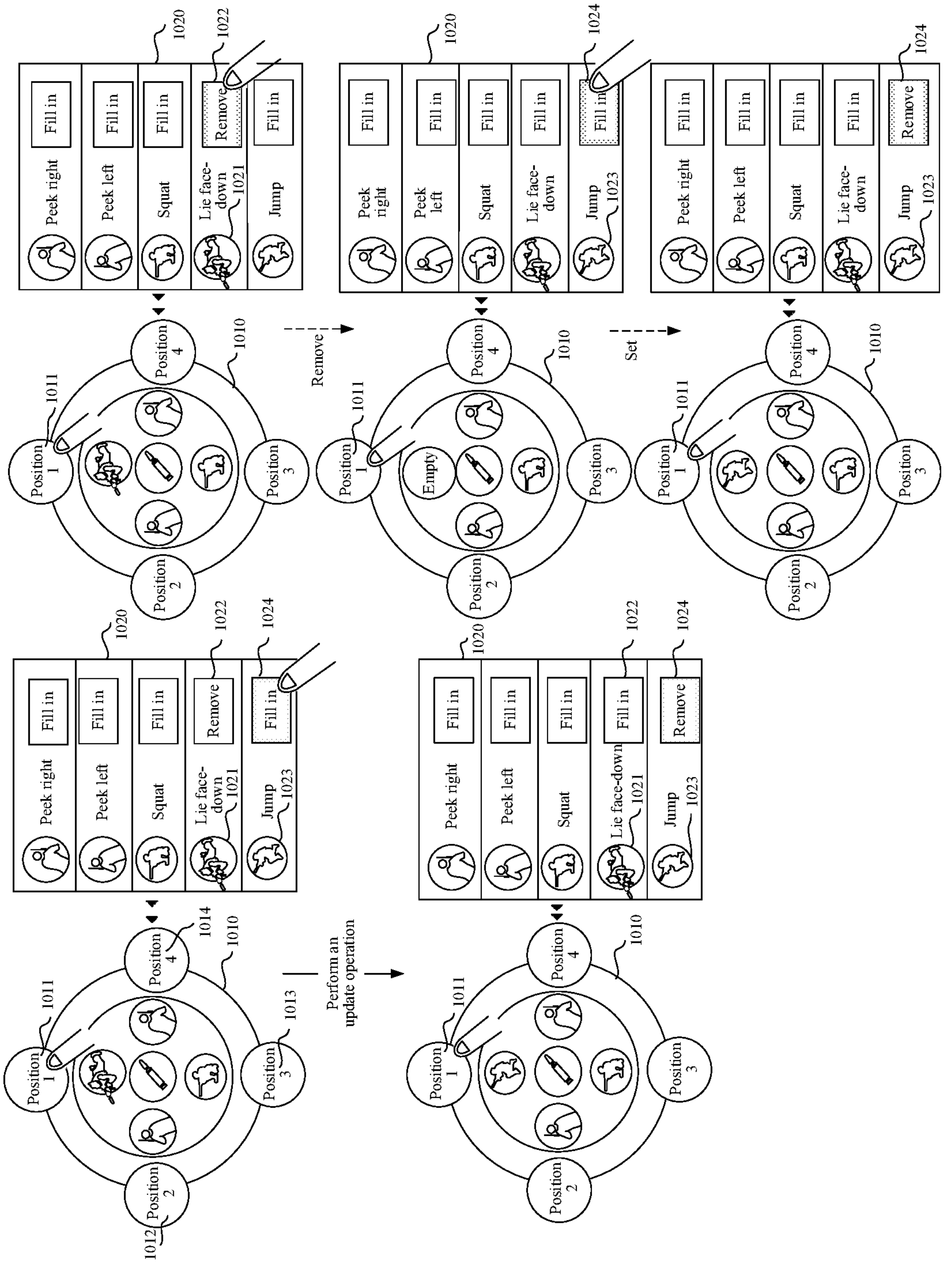
FIG. 10 is an interface schematic diagram of a virtual wheel control setting process according to an embodiment of this application.

Schematically, as shown in FIG. 10, when the user enters the configuration interface of the virtual wheel control, a virtual wheel control 1010 and a corresponding action selection list 1020 are displayed on the interface. A virtual wheel control 1010 includes a first wheel sub-region 1011, a second wheel sub-region 1012, a third wheel sub-region 1013, and a fourth wheel sub-region 1014, and a first action option is displayed in the first wheel sub-region 1011. The action selection list includes a second action option 1023 and a setting control 1024 corresponding to the action option 1023.

In some embodiments, in the configuration interface of the virtual wheel control, the user may also modify the quantity of the first wheel sub-regions into which the virtual wheel is divided.

Step 902: Update, in response to a configuration operation in the configuration interface, the action option contained in the virtual wheel control.

In some embodiments, a default action option may be set in the virtual wheel control in a terminal. When needing to modify or update the action option displayed in the virtual wheel control, the user may perform the corresponding configuration operation in the configuration interface, such as selecting an action option that needs to be modified in the virtual wheel control, and selecting an action option that needs to be set in the action selection list so as to update the action option in the virtual wheel control.

In some embodiments, the configuration operation may be used for removing an existing action option in the virtual wheel control, or may be used for replacing the existing action option in the virtual wheel control, etc. Corresponding steps 902 may include steps 902A to 902C.

Step 902A: Receive a selection operation on a to-be-configured wheel sub-region in the virtual wheel control, the first action option being displayed in the to-be-configured wheel sub-region.

The user may select a wheel sub-region needing to be configured from the virtual wheel control, correspondingly the terminal receives the selection operation on the to-be-configured wheel sub-region in the virtual wheel control, and it is determined that the user needs to modify the first action option displayed in the wheel sub-region. The selection operation may be a press and hold operation, a click operation, a press operation, or the like on the to-be-configured wheel sub-region, and the embodiment of this application does not limit the selection operation.

Schematically, as shown in FIG. 10, when the user presses and holds the first wheel sub-region 1011, the terminal receives a selection operation on the first wheel sub-region 1011, and then the first wheel sub-region 1011 becomes the to-be-configured wheel sub-region, indicating that the user needs to modify the first action option displayed therein.

Step 902B: Update, in response to a trigger operation on a setting control corresponding to a second action option in the action selection list, the first action option displayed in the to-be-configured wheel sub-region to the second action option.

After selecting the wheel sub-region needing to be configured (the to-be-configured wheel sub-region) through the selection operation, the user may further select the action option needing to be set from the action selection list. Correspondingly the terminal receives the trigger operation on the setting control corresponding to the second action option in the action selection list, indicating that the user needs to replace the first action option with the second action option, and then the terminal may update the first action option displayed in the to-be-configured wheel sub-region with the second action option according to the trigger operation.

Schematically, as shown in FIG. 10, when the user selects the action option 1023 from the action selection list 1020 and perform a trigger operation on the setting control 1024 corresponding to the action option, the terminal may add the selected second action option 1023 to the to-be-edited wheel sub-region 1011 in the virtual wheel control 1010 according to the trigger operation, and after saving, the user may use the added action option 1023 in a game battle. In some embodiments, a first action option 1021 originally displayed in the first wheel sub-region 1011 is replaced with the second action option 1023. In some embodiments, in the action selection list 1020, a setting control 1022 corresponding to the first action option 1021 is updated to "fill in", while the setting control 1024 corresponding to the second action option 1021 is updated to "remove".

In some embodiments, the trigger operation may be clicking, pressing and holding, sliding, or the like. This is not limited in the embodiment of this application.

Step 902C: Remove, in response to a trigger operation on a removal control corresponding to the first action option in the action selection list, the first action option displayed in the to-be-configured wheel sub-region.

In some embodiments, if the action option is displayed in the virtual wheel control, the action option in the action selection list corresponds to the removal control, so that the user may delete the action option in the virtual wheel control by triggering the removal control; if the action option is not displayed in the virtual wheel control, the action option in the action selection list corresponds to the setting control, so that the user may configure the action option into the virtual wheel control by triggering the setting control.

When the user selects an action option from the action selection list, if the action option is in the to-be-configured wheel sub-region of the virtual wheel, the terminal may remove the action option from the to-be-configured wheel sub-region of the virtual wheel through the trigger operation on the corresponding removal control.

Schematically, as shown in FIG. 10, when the user selects the first action option 1021 from the action selection list 1020 (the first action option 1021 is displayed in the first wheel sub-region 1011 in the virtual wheel control 1010), and performs the trigger operation on the removal control 1022 corresponding to the first action option 2021, the first action option may be removed from the first wheel sub-region 1011 in the virtual wheel control; the control corresponding to the first action option 1021 in the action selection list 1020 is a "fill-in control". If subsequently the user does not select other action options from the action selection list 1020 to add, the first wheel sub-region 1011 displays "empty", and during the game battle, when the virtual wheel control 1010 is displayed on the periphery of the attack control, only three action options are displayed in the virtual wheel control 1010. If subsequently the user selects other action options from the action selection list 1020 to add, for example, if the user triggers the setting control 1024 corresponding to the second action option 1023, the terminal displays the selected second action option 1024 in the to-be-edited wheel sub-region 1011, and the user may use the second action option 1024 during the game battle. In some embodiments, in the action selection list, the setting control corresponding to the second action option 1023 becomes a "removal control".

Figure 11:
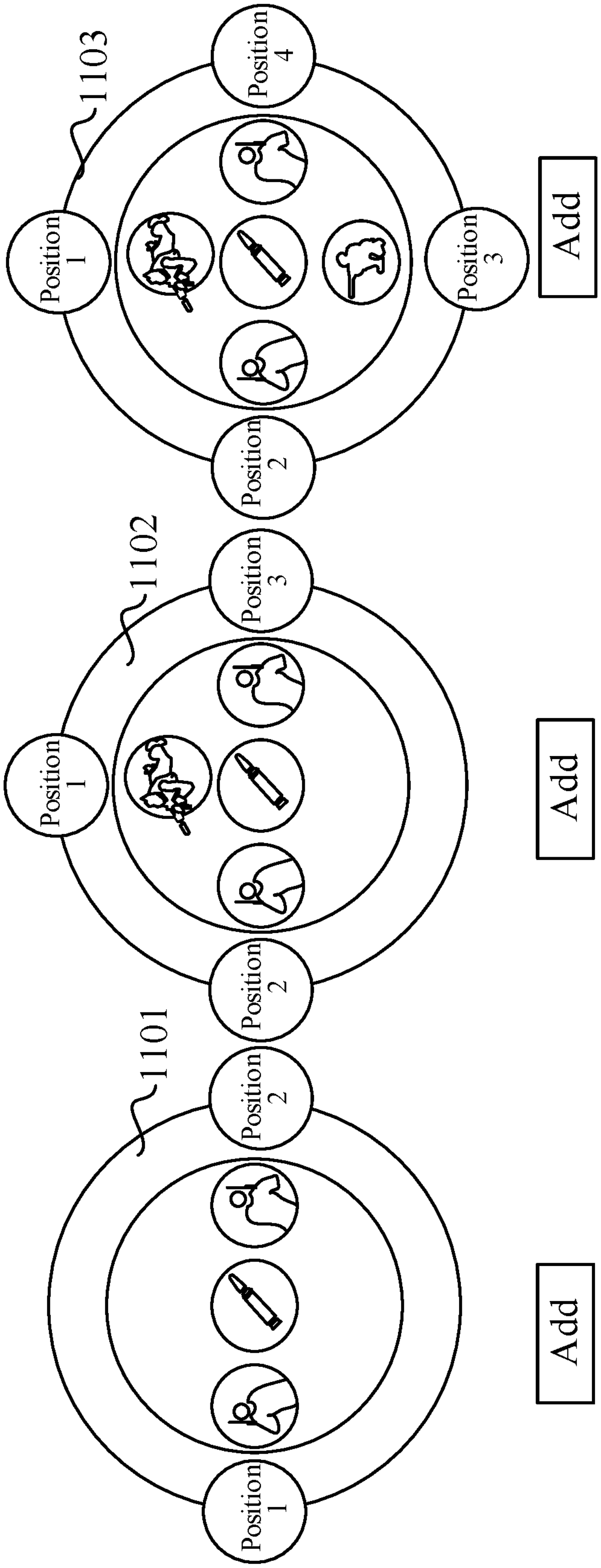
FIG. 11 is an interface schematic diagram of a virtual wheel control setting process according to another embodiment of this application.

In one possible implementation, in the configuration interface, not only the action option in the virtual wheel control may be set, but also a region division mode of the virtual wheel control may be set. Schematically, as shown in FIG. 11, the configuration interface also displays a virtual wheel control 2 having multiple different division modes, such as bisecting (a first virtual wheel control 1101), trisecting (a second virtual wheel control 1102), and quadrisecting (a third virtual wheel control 1103), and the user may select an appropriate division mode of the virtual wheel control according to the requirements of the battle.

In this embodiment, the virtual wheel control may be configured through the configuration interface, the action control in the virtual wheel sub-region may be switched through the trigger operation on the corresponding action option in the action selection list, and the user may add a commonly used action control to the virtual wheel sub-region through this configuration interface. In addition, the terminal also provides a variety of different virtual wheels for the user to select, thereby implementing personalization and diversification of the action control in a virtual wheel.

In one possible implementation, when the user ends a second trigger operation on the attack control, in response to ending of the second trigger operation on the attack control, the terminal controls the virtual object to stop attacking and stop performing a first action. In some embodiments, when the virtual object is in a continuous action state such as lying face-down or standing before the attack, when the user ends the second trigger operation on the attack control, the terminal may control the virtual object to stop attacking and control the virtual object to resume to the action state before the attack.

In some embodiments, when the virtual object is in a discontinuous action state such as jumping or sliding tackle before the attack, when the user ends the second trigger operation on the attack control, the terminal may control the virtual object to stop attacking and control the virtual object to resume to the standing state.

In some embodiments, the user may switch an action control mode through a setting interface. However, the efficiency of switching the object action mode through the setting interface is low. In order to improve switching efficiency, in another possible implementation, a mode switching control may be set, and the user may switch the action mode through the mode switching control. The method includes the following steps:

Step one: Display the mode switching control, the mode switching control being configured to trigger switching of the object action mode.

In one possible implementation, there are multiple action modes in the game battle, and the user may select different object action modes according to different stages of the game, or select different object action modes according to current scenes. If the object action mode needs to be switched from the configuration interface every time, the switching process is too complex and the virtual object is easily eliminated due to a sneak attack from an enemy virtual object. In order to improve mode switching efficiency, this embodiment provides the mode switching control that may be displayed around the attack control, so that the user may switch different object action modes when using the attack control.

Figure 12:
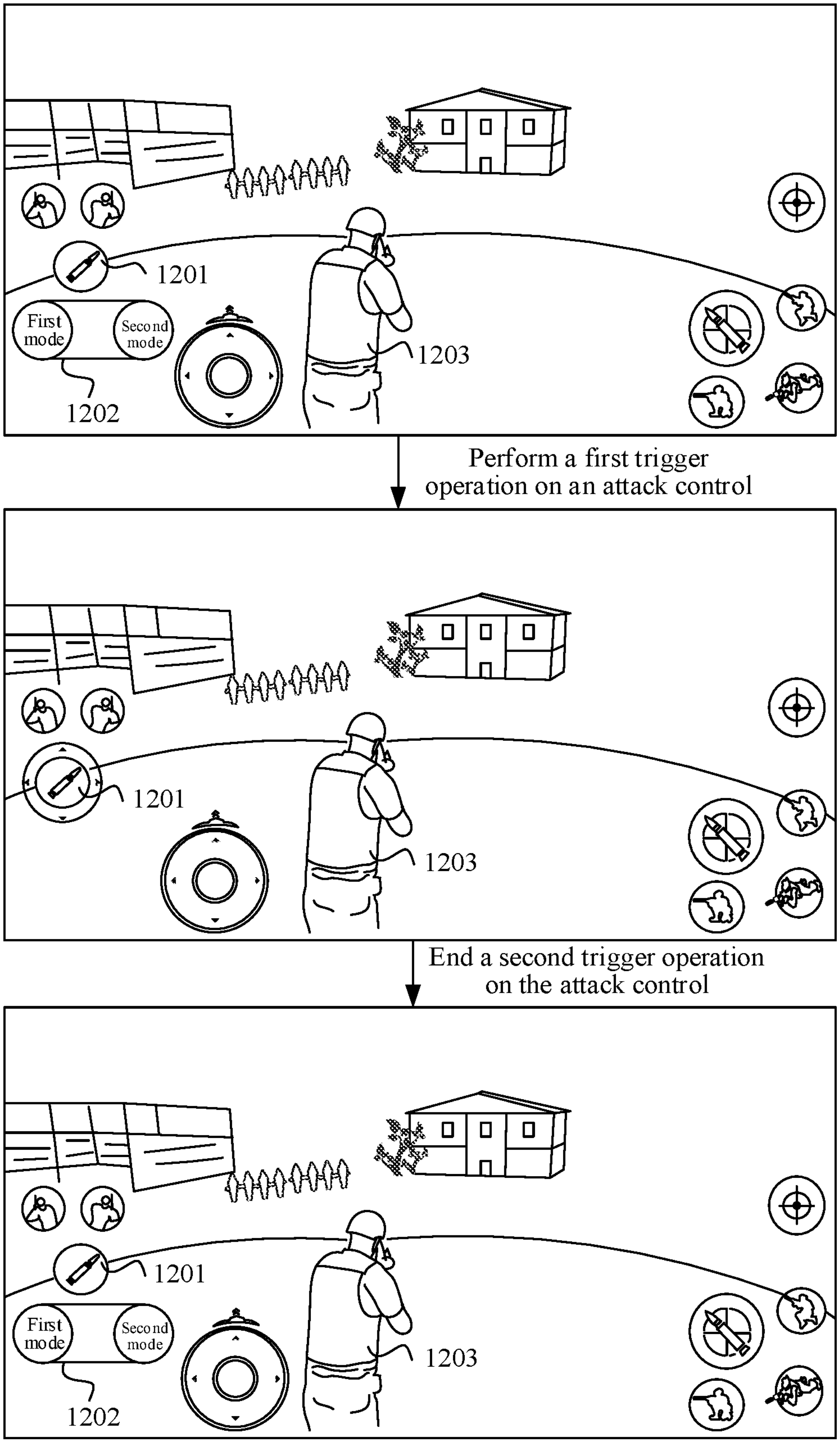
FIG. 12 is an implementation schematic diagram of a mode switching control display and hiding process according to an embodiment of this application.

As shown in FIG. 12, a mode switching control 1202 is displayed below an attack control 1201, and a user may implement mode switching between at least two object action modes through the control.

In some embodiments, the mode switching control may be a button, a slider, a slide bar, or the like, for the user to operate. This is not limited in the embodiment of this application.

Step two: Switch the object action mode in response to a third trigger operation on the mode switching control.

When the user performs the third trigger operation on the mode switching control, the terminal may switch the object action mode in the game battle.

In some embodiments, the third trigger operation may be clicking, pressing and holding, sliding, or the like. This is not limited in the embodiment of this application.

When the mode switching control is a button, the corresponding third trigger operation may be clicking or pressing and holding, and the user may switch the object action mode by clicking or pressing and holding the mode switching button. When the mode switching control is a slider or slide bar, the corresponding third trigger operation may be sliding, dragging, or the like, and the user may switch the object action mode through a slide or drag operation on the mode switching control.

Step three: Hide the mode switching control in response to a first trigger operation on the attack control.

In one possible implementation, multiple controls are displayed in a virtual environment picture, the position of the mode switching control may be very close to the position of the attack control, and then the user easily mistakenly touches the mode switching control when performing the trigger operation on the attack control. In order to prevent the user from mistakenly touching the mode switching control when performing the trigger operation on the attack control, the mode switching control is controlled to be hidden when the virtual object attacks. When the user performs the first trigger operation on the attack control, the terminal controls the virtual object to attack and displays the action control on the periphery of the attack control by taking the attack control as a center. In addition, the terminal controls the mode switching control to be hidden.

Step four: Resume, in response to ending of the second trigger operation on the attack control, the displaying of the mode switching control.

In one possible implementation, when the user ends the second trigger operation on the attack control, the terminal may resume the displaying of the mode switching control while controlling the virtual object to stop attacking and an action.

Schematically, as shown in FIG. 12, when a virtual object 1203 does not attack, the mode switching control 1202 is displayed in the upper layer of the virtual environment picture, and the specific display position may be below the attack control 1201, so that the user quickly clicks on the mode switching control 1202 to switch the action mode. When the user performs the first trigger operation on the attack control 1201, the virtual object 1203 attacks according to the trigger operation. The terminal may control the mode switching control 1202 to be hidden, so as to avoid the switching of the object action mode caused by the user mistakenly touching the mode switching control 1202 when triggering the attack control 1201. When the user ends the second trigger operation on the attack control 1201, the virtual object 1203 ends the attack. In this case, the terminal may redisplay the mode switching control 1202, so that the user switches the object action mode according to a battle situation.

In this embodiment, by setting the mode switching control, the user may switch the object action mode through the operation of the mode switching control in the game battle, without switching the object action mode from the configuration interface. Switching the object action mode by using the mode switching control may effectively prevent the virtual object being defeated by the enemy virtual object due to the switching of the object action mode. In addition, the mode switching control may be hidden when the virtual object attacks and continue to be displayed when the virtual object ends the attack, so as to effectively prevent the user from mistakenly touching the mode switching control when controlling the virtual object to attack.

Figure 13:
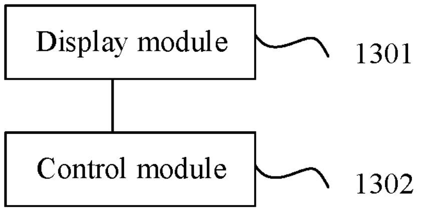
FIG. 13 is a structural block diagram of a virtual object control apparatus according to an embodiment of this application.

FIG. 13 is a structural block diagram of a virtual object control apparatus according to an exemplary embodiment of this application. The apparatus includes:

a display module 1301, configured to display a virtual environment picture and an attack control, the virtual environment picture containing a virtual object, and the attack control being configured to trigger the virtual object to attack; and a control module 1302, configured to control, in response to a first trigger operation on the attack control, the virtual object to attack, and display an action control adjacent the attack control, the action control being configured to trigger the virtual object to perform an action (e.g., a non-attack action), the control module 1302 being configured to control, in response to a second trigger operation on the action control, the virtual object to perform a first action according to the action control while performing attacks according to the attack control.

In some embodiments, the control module 1302 is further configured to:

determine an action control mode; and display the action control of the object action mode adjacent the attack control, different action modes corresponding to different action controls.

In some embodiments, the control module 1302 is further configured to:

display, when the object action mode is a first action mode, a virtual joystick control around the attack control by taking the attack control as a center, the virtual joystick control being configured to control the virtual object to move; and the control module 1302 is further configured to:

control, in response to a drag operation on the attack control, the virtual object to move during the attack based on a drag direction of the drag operation.

In some embodiments, the control module 1302 is further configured to:

display, when the object action mode is a second action mode, a virtual wheel control around the attack control by taking the attack control as a center, the virtual wheel control being divided into at least two first wheel sub-regions located at different positions, and an action option of the second action being displayed in each first wheel sub-region; and the control module 1302 is further configured to:

determine, in response to a drag operation on the attack control, a second wheel sub-region from the at least two first wheel sub-regions based on a control position of the attack control after dragging, the control position overlapping the second wheel sub-region; and control the virtual object to perform the first action during the attack, the first action being a second action displayed in the second wheel sub-region.

In some embodiments, the control module 1302 is configured to:

control, when a dwell duration of the attack control at the control position reaches a duration threshold, the virtual object to perform the first action during the attack.

In some embodiments, the apparatus further includes:

the display module 1301, further configured to display a configuration interface of the virtual wheel control; and an update module, configured to update, in response to a configuration operation within the configuration interface, the action option contained in the virtual wheel control.

In some embodiments, the update module is further configured to:

receive a selection operation on a to-be-configured wheel sub-region in the virtual wheel control, a first action option being displayed in the to-be-configured wheel sub-region;

update, in response to a trigger operation on a setting control corresponding to a second action option in an action selection list, the first action option displayed in the to-be-configured wheel sub-region to the second action option; and remove, in response to a trigger operation on a removal control corresponding to the first action option in the action selection list, the first action option displayed in the to-be-configured wheel sub-region.

In some embodiments, the display module 1301 is further configured to display a mode switching control, the mode switching control being configured to trigger switching of the object action mode; and a switching module is configured to switch the object action mode in response to a third trigger operation on the mode switching control.

In some embodiments, the apparatus further includes:

a hiding module, configured to hide the mode switching control in response to the first trigger operation on the attack control; and a resuming module, configured to resume, in response to ending of the second trigger operation on the attack control, the displaying of the mode switching control.

In some embodiments, the apparatus further includes:

the control module 1302, further configured to control, in response to the ending of the second trigger operation on the attack control, the virtual object to stop attacking and stop performing the first action.

Figure 14:
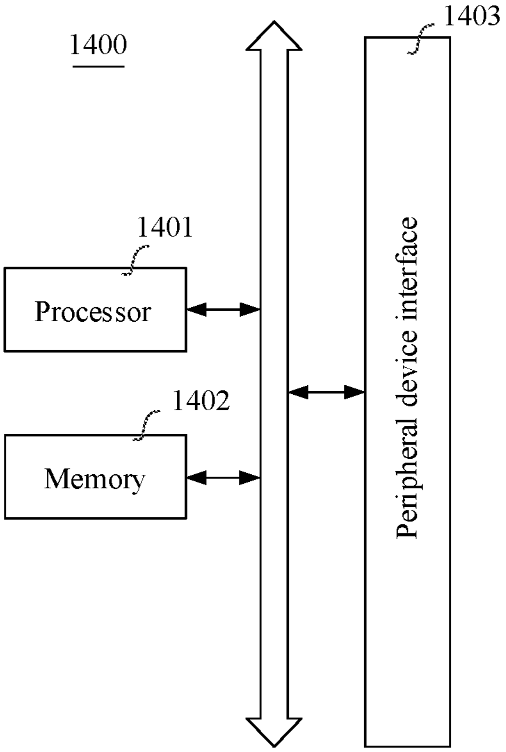
FIG. 14 is a schematic structural diagram of a terminal according to an embodiment of this application.

FIG. 14 is a structural block diagram of a terminal 1400 according to an exemplary embodiment of this application. The terminal 1400 may be a mobile terminal, such as a smartphone, a tablet computer, a moving picture experts group audio layer III (MP3) player, or a moving picture experts group audio layer IV (MP4) player. The terminal 1400 may also be called a user equipment, a portable terminal, or the like.

The terminal 1400 generally includes: a processor 1401 and a memory 1402.

The processor 1401 may include one or more processing cores, for example, a 4-core processor or an 8-core processor. The processor 1401 may be implemented in at least one hardware form of a digital signal processor (DSP), a field-programmable gate array (FPGA), and a programmable logic array (PLA). The processor 1401 may also include a main processor and a co-processor. The main processor is a processor configured to process data in a wakeup state, also called a central processing unit (CPU). The co-processor is a low-power processor configured to process data in a standby state. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process computing operations related to machine learning.

The memory 1402 may include one or more computer-readable storage media. The computer-readable storage medium may be tangible and non-transitory. The memory 1402 may further include a high-speed random access memory and a nonvolatile memory, for example, one or more disk storage devices or flash storage devices. In some embodiments, the non-transitory computer-readable storage medium in the memory 1402 is configured to store at least one instruction, the at least one instruction being configured to be executed by the processor 1401 to implement the virtual object control method according to the embodiments of this application.

In some embodiments, the terminal device 1400 may include a peripheral device interface 1403 and at least one peripheral device. For example, the peripheral device includes a radio frequency circuit, a touch display screen, power supply, etc.

A person skilled in the art may understand that the structure shown in FIG. 14 constitutes no limitation on the terminal 1400, and the terminal may include more or fewer components than those shown in the figure, or some components may be combined, or a different component arrangement may be used.

In the embodiments of this application, a computer-readable storage medium is further provided. The storage medium stores at least one instruction, the instruction being loaded and executed by a processor to implement the virtual object control method according to the above aspect.

According to an aspect of this application, a computer program is provided. The computer program includes a computer instruction, when executed by a processor, implementing the virtual object control according to the foregoing embodiments.

A person skilled in the art may be aware that in the foregoing one or more examples, functions described in the embodiments of this application may be implemented by hardware, software, firmware, or any combination thereof. When implemented by using software, the functions may be stored in a computer-readable storage medium or may be used as one or more instructions or codes in a computer-readable storage medium for transmitting. The computer-readable storage medium includes a computer storage medium and a communication medium, where the communication medium includes any medium that enables a computer program to be transmitted from one place to another. The storage medium may be any available medium accessible to a general-purpose or dedicated computer.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing is merely exemplary embodiments of this application, but is not intended to limit this application. Any modification, equivalent replacement, or improvement made within the spirit and principle of this application shall fall within the scope of protection of this application.

What is claimed is:

1. A virtual object control method performed by a terminal, the method comprising:

displaying a virtual environment picture and an attack control, the virtual environment picture containing a virtual object, and the attack control being configured to trigger the virtual object to attack;

in response to a first trigger operation on the attack control, displaying an action control adjacent the attack control, the action control being configured to trigger the virtual object to perform a non-attack action, wherein the displaying an action control adjacent the attack control comprises:

choosing, among a plurality of action control modes corresponding to different action controls, an action control mode and an associated action control; and displaying the action control associated with the chosen action control mode adjacent the attack control; and in response to a second trigger operation on the action control, controlling the virtual object to perform a first action according to the action control while performing attacks according to the attack control.

2. The method according to claim 1, wherein the displaying the action control associated with the chosen action control mode adjacent the attack control comprises:

when the chosen action control mode is a first action mode, displaying a virtual joystick control around the attack control, the virtual joystick control being configured to control the virtual object to move; and the controlling the virtual object to perform a first action according to the action control comprises:

in response to a drag operation on the attack control, controlling the virtual object to move in a direction of the drag operation defined by the virtual joystick control.

3. The method according to claim 1, wherein the displaying the action control associated with the chosen action control mode adjacent the attack control comprises:

when the chosen action control mode is a second action mode, displaying a virtual wheel control around the attack control, the virtual wheel control being divided into at least two first wheel sub-regions located at different positions, with an action option displayed in each first wheel sub-region; and the controlling the virtual object to perform a first action according to the action control comprises:

in response to a drag operation on the attack control, determining a second wheel sub-region from the at least two first wheel sub-regions based on a control position of the attack control overlapping the second wheel sub-region; and controlling the virtual object to perform the first action according to the action option associated with the second wheel sub-region while performing the attacks.

4. The method according to claim 1, wherein the method further comprises:

displaying a mode switching control, the mode switching control being configured to trigger switching of the action control mode; and switching the action control mode in response to a third trigger operation on the mode switching control.

5. The method according to claim 4, wherein the method further comprises:

hiding the mode switching control in response to the first trigger operation on the attack control; and resuming the displaying of the mode switching control in response to ending of the second trigger operation on the attack control.

6. The method according to claim 1, wherein the method further comprises:

in response to the ending of the second trigger operation on the attack control, controlling the virtual object to stop performing the first action and the attacks.

7. A terminal, comprising a processor and a memory, the memory storing at least one program, the at least one program being loaded and executed by the processor and causing the terminal to perform a virtual object control method including:

displaying a virtual environment picture and an attack control, the virtual environment picture containing a virtual object, and the attack control being configured to trigger the virtual object to attack;

in response to a first trigger operation on the attack control, displaying an action control adjacent the attack control, the action control being configured to trigger the virtual object to perform a non-attack action, wherein the displaying an action control adjacent the attack control comprises:

choosing, among a plurality of action control modes corresponding to different action controls, an action control mode and an associated action control; and displaying the action control associated with the chosen action control mode adjacent the attack control; and in response to a second trigger operation on the action control, controlling the virtual object to perform a first action according to the action control while performing attacks according to the attack control.

8. The terminal according to claim 7, wherein the displaying the action control associated with the chosen action control mode adjacent the attack control comprises:

when the chosen action control mode is a first action mode, displaying a virtual joystick control around the attack control, the virtual joystick control being configured to control the virtual object to move; and the controlling the virtual object to perform a first action according to the action control comprises:

in response to a drag operation on the attack control, controlling the virtual object to move in a direction of the drag operation defined by the virtual joystick control.

9. The terminal according to claim 8, wherein the displaying the action control associated with the chosen action control mode adjacent the attack control comprises:

when the chosen action control mode is a second action mode, displaying a virtual wheel control around the attack control, the virtual wheel control being divided into at least two first wheel sub-regions located at different positions, with an action option displayed in each first wheel sub-region; and the controlling the virtual object to perform a first action according to the action control comprises:

in response to a drag operation on the attack control, determining a second wheel sub-region from the at least two first wheel sub-regions based on a control position of the attack control overlapping the second wheel sub-region; and controlling the virtual object to perform the first action according to the action option associated with the second wheel sub-region while performing the attacks.

10. The terminal according to claim 7, wherein the method further comprises:

displaying a mode switching control, the mode switching control being configured to trigger switching of the action control mode; and switching the action control mode in response to a third trigger operation on the mode switching control.

11. The terminal according to claim 10, wherein the method further comprises:

hiding the mode switching control in response to the first trigger operation on the attack control; and resuming the displaying of the mode switching control in response to ending of the second trigger operation on the attack control.

12. The terminal according to claim 7, wherein the method further comprises:

in response to the ending of the second trigger operation on the attack control, controlling the virtual object to stop performing the first action and the attacks.

13. A non-transitory computer-readable storage medium, storing at least one program, the at least one program being loaded and executed by a processor of a terminal and causing the terminal to perform a virtual object control method including:

displaying a virtual environment picture and an attack control, the virtual environment picture containing a virtual object, and the attack control being configured to trigger the virtual object to attack;

in response to a first trigger operation on the attack control, displaying an action control adjacent the attack control, the action control being configured to trigger the virtual object to perform a non-attack action, wherein the displaying an action control adjacent the attack control comprises:

choosing, among a plurality of action control modes corresponding to different action controls, an action control mode and an associated action control; and displaying the action control associated with the chosen action control mode adjacent the attack control; and in response to a second trigger operation on the action control, controlling the virtual object to perform a first action according to the action control while performing attacks according to the attack control.

14. The non-transitory computer-readable storage medium according to claim 13, wherein the displaying the action control associated with the chosen action control mode adjacent the attack control comprises:

when the chosen action control mode is a first action mode, displaying a virtual joystick control around the attack control, the virtual joystick control being configured to control the virtual object to move; and the controlling the virtual object to perform a first action according to the action control comprises:

in response to a drag operation on the attack control, controlling the virtual object to move in a direction of the drag operation defined by the virtual joystick control.

15. The non-transitory computer-readable storage medium according to claim 13, wherein the displaying the action control associated with the chosen action control mode adjacent the attack control comprises:

when the action control mode is a second action mode, displaying a virtual wheel control around the attack control, the virtual wheel control being divided into at least two first wheel sub-regions located at different positions, with an action option displayed in each first wheel sub-region; and the controlling the virtual object to perform a first action according to the action control comprises:

in response to a drag operation on the attack control, determining a second wheel sub-region from the at least two first wheel sub-regions based on a control position of the attack control overlapping the second wheel sub-region; and controlling the virtual object to perform the first action according to the action option associated with the second wheel sub-region while performing the attacks.

16. The non-transitory computer-readable storage medium according to claim 13, wherein the method further comprises:

displaying a mode switching control, the mode switching control being configured to trigger switching of the object action mode; and switching the object action mode in response to a third trigger operation on the mode switching control.

17. The non-transitory computer-readable storage medium according to claim 13, wherein the method further comprises:

in response to the ending of the second trigger operation on the attack control, controlling the virtual object to stop performing the first action and the attacks.

* * * * *